United States Patent [19]
Weisgerber

[11] 3,822,532
[45] July 9, 1974

[54] OIL MIST RECOVERY APPARATUS

[75] Inventor: Harold W. Weisgerber, Reading, Ohio

[73] Assignee: The Kirk and Blum Manufacturing Co., Cincinnati, Ohio

[22] Filed: Nov. 12, 1971

[21] Appl. No.: 198,265

[52] U.S. Cl............ 55/324, 55/332, 55/337, 55/341, 55/439, 55/461
[51] Int. Cl............................. B01d 50/00
[58] Field of Search........... 55/323, 315, 318, 319, 55/320, 321, 324, 332, 334, 337, 341, 434, 437, 439, 461

[56] References Cited
UNITED STATES PATENTS
3,353,340  11/1967  Carsey .................... 44/324
3,543,325  12/1970  Hamrick ................. 55/434 X

*Primary Examiner*—Frank W. Lutter
*Assistant Examiner*—William Cuchlinski, Jr.
*Attorney, Agent, or Firm*—Walter S. Murray

[57] ABSTRACT

Apparatus is disclosed for effecting separation of oil mist from a carrier air stream particularly for use in the reclamation of oil mist that is generated in or near factory equipment and to the cleaning and return of the carrier air stream to the factory area. The apparatus includes a horizontally operable centrifuge chamber disposed above one end portion of an oil collecting pan, a primary oil mist filter located above the opposed end portion of the pan and a secondary oil mist filter positioned above the primary oil mist filter. The relative dispositions of the filters and the centrifuge chamber provide a number of sharp changes in direction of the oil mist ladened air stream through the apparatus to effect optimum oil mist-from-air stream separation.

2 Claims, 5 Drawing Figures

INVENTOR
Harold W. Weisgerber
BY
ATTY.

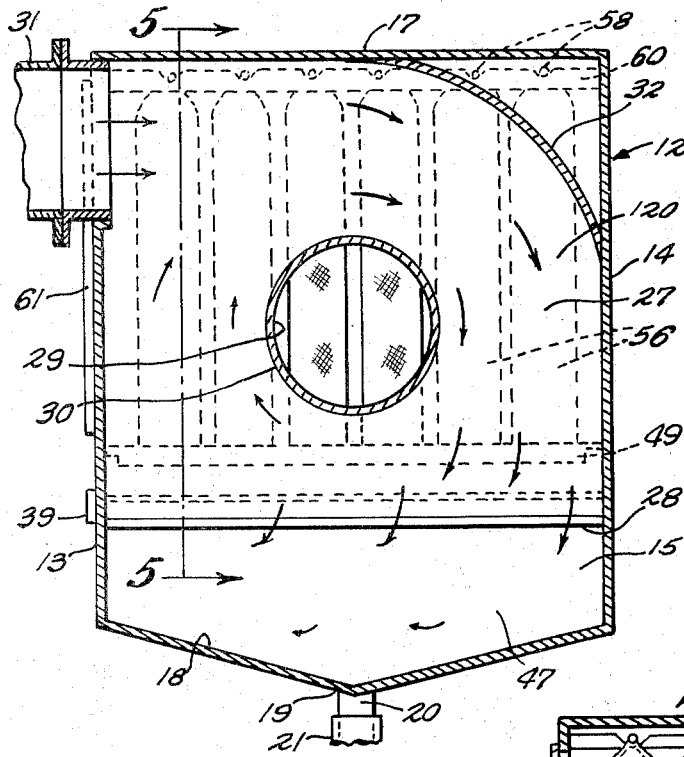
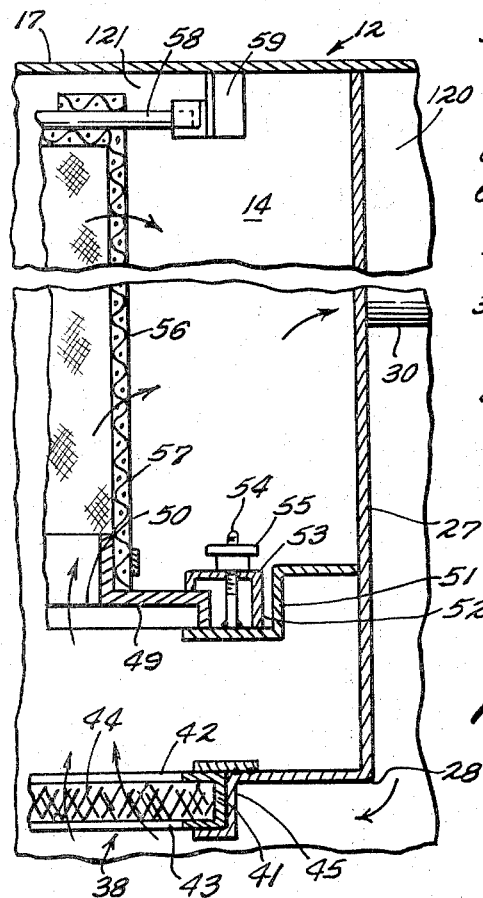
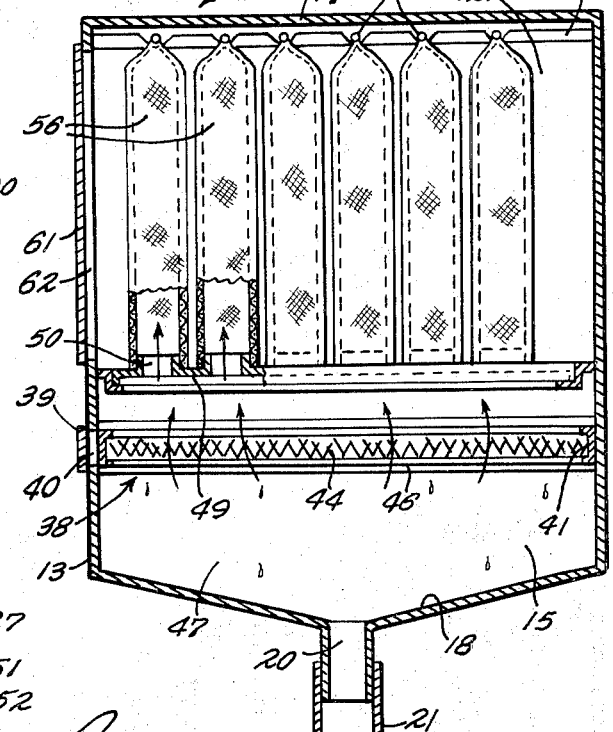

OIL MIST RECOVERY APPARATUS

BACKGROUND OF THE INVENTION

This invention relates to improvements in apparatus for effecting separation of a liquid mist from a gas stream and is particularly directed to apparatus especially adapted for the reclamation of cutting oil mist used as a lubricant in machine tool operations.

SUMMARY OF THE INVENTION

The function of my apparatus is to retain, as it passes, cutting oil mist which is in suspension in a forced current of air drawn from the working area of a machine tool, returning the cutting oil to a machine tool reservoir and discharging the oil mist free air to atmosphere or to the factory area.

My apparatus comprises a centrifuge and primary and secondary filters each of which discharge its portion of separated oil into a common oil collecting pan, the said centrifuge and filters being so juxtaposed above the pan as to provide three sharp changes in direction of the oil mist ladened air forced through the apparatus to thereby secure optimum conditions for oil mist and air separation and the discharge of the oil into the collecting pan.

The principal objects of the invention are to provide an efficient device for effecting optimum separation of oil mist entrained in a rapidly moving stream of air; to provide a compact separator unit that may desirably be ceiling hung in a factory area whereby recuperated oil mist may be gravity returned to the cutting oil reservoirs of machine tools; to provide a greater degree of free flowing oil mist carrier air through a separator by maintenance of the filters free of excess oil; and to provide a highly efficient and service-free apparatus having the foregoing characteristics and functions.

Other objects and advantages of my invention will become apparent from the following specification and the accompanying drawings which illustrated a preferred embodiment thereof.

BRIEF DESCRIPTION OF THE DRAWINGS

FIGS. 3 and 4 are sections taken on lines 3—3 and 4—4 of FIG. 1, respectively.

FIG. 5 is an enlarged, fragmental section taken on line 5—5 of FIG. 3.

DESCRIPTION OF THE PREFERRED EMBODIMENT

Figure 1:
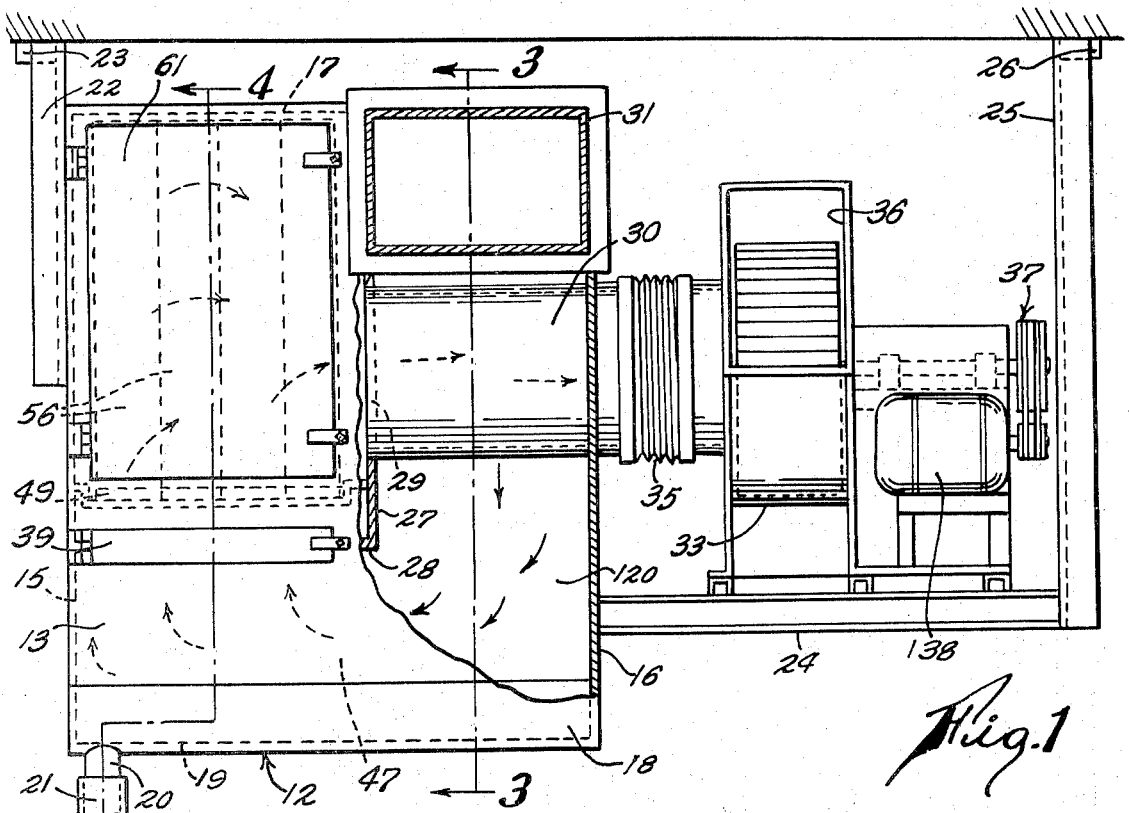
FIG. 1 is a fragmental front elevational view of my oil mist recovery apparatus.

Referring to the drawings more particularly by reference numerals, 12 indicates a casing of my apparatus for separating oil from a current of oil mist ladened air, said casing being substantially rectangular and having a front wall 13, rear wall 14, end walls 15 and 16 and a top wall 17, the bottom portions of the front and rear walls converging downwardly to form an oil collecting pan 18 having a central trough portion 19 which directs oil separated from the current of air into a drain pipe 20. The drain pipe is connected to a gravity oil return line 21 in any suitable manner. The end wall 15 has a vertical hangar member 22 connected thereto, the hangar being fixed at its upper end to a ceiling mounted bracket 23. A rigid frame 24 (FIGS. 1 and 2) extends horizontally from the end wall 16 and is connected at its outer ends to a vertical hangar member 25 which is also fixed at its upper end to a ceiling mounted bracket 26, in the usual manner.

A partition member 27 extends laterally across the upper central, interior portion of the casing, the marginal edges of the partition member engaging the interior surfaces of the top wall 17 and the front and rear walls, the bottom end 28 of said partition member terminating substantially above the oil collecting pan 18 of the casing. It will therefore be seen that the partition member 27 divides the upper interior part of the casing above the pan 18 into a centrifuge chamber 120 and a filter chamber 121. The central part of the partition member 27 is provided with a large aperture 29, a horizontal air discharge pipe 30 having one end fitted into the aperture and extending through the centrifuge chamber and beyond the casing end wall 16 (FIG. 1). An oil mist ladened air inlet pipe 31 extends through the upper part of the front wall 13, said pipe being connected to a remote cutting oil mist generator and tool applicator in a factory area by the extension of said pipe 31 (not shown). A circular baffle 32 is positioned within a corner of the centrifuge chamber opposed to the inlet pipe 31 and, as best shown in FIG. 3, the eccentric position of the inlet pipe 31, the discharge pipe 30 and the baffle 32 form a horizontally disposed centrifuge for the current of oil mist ladened air introduced through pipe 31; the centrifuge being effectively positioned above one end of the oil collecting pan 18.

Figure 2:
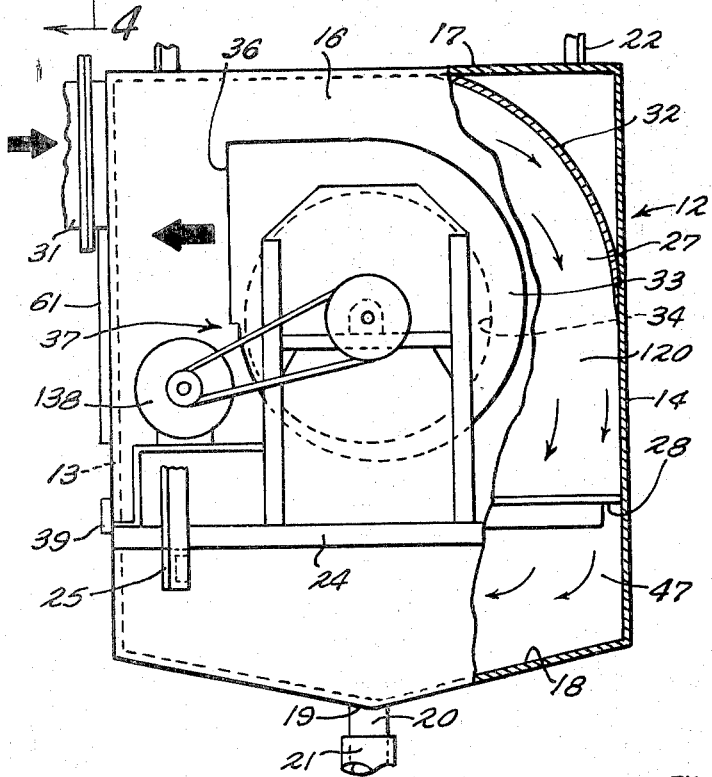
FIG. 2 is a fragmental, side elevational view of the apparatus shown in FIG. 1.

With reference to FIGS. 1 and 2 of the drawings an exhaust fan 33 is mounted on the frame 24 and has its intake aperture 34 connected by a flexible pipe 35 to the extended free end of the discharge pipe 30; the outlet 36 of the fan being adapted to discharge clean air either to atmosphere or to the factory area, as desired. The fan is driven through a pulley and belt arrangement 37 by means of an electric motor 138 mounted on the frame 24.

The filter chamber 121 has a primary oil mist filter 38 positioned horizontally and on a level with the bottom end 28 of the partition 27, said filter extending longitudinally from said edge to the end wall 15 of the casing and also extending laterally between the front and rear walls 13 and 14, respectively, of the casing. The filter is removable for cleaning purposes through a hinged door 39 closing an opening 40 in the front wall 13 of the casing, said filter preferably comprising a rectangular marginal frame 41 having inturned upper and lower marginal flanges 42 and 43, respectively, that frame a matted wire mesh 42. The filter 38 is removably positioned above the oil pan by a pair of confronting slides 45 and 46. It will be noted that a horizontal passageway 47 extends from end-to-end of the casing above the oil pan 18 and beneath and in direct communication with the centrifuge 27 and the primary oil mist filter 38.

A secondary oil mist filter 48 is disposed in the filter chamber 121 above the primary oil filter 38 and comprises a stamped metal frame 49 having a plurality of holes 50 formed therein, said frame being held in a rectangular seat 51 extending from the partition 27 (FIG. 5), the rear wall 14 and the end wall 15 in the casing. The frame is removably held in the seat 51 by clamps 52 including an inverted U-shaped bracket 53 held against the frame by a threaded shank 54 welded to the seat and having a cooperative nut 55 adapted to urge the clamp 52 downwardly against the frame 49 on the seat. The secondary filter includes a number of upstanding fabric bags 56, each having an open lower end encircling and fastened to a flange 57 that surrounds each hole 50 in the frame 49, the upper ends of the bags being supported by rods 58 attached to the bags and having the rod ends entered between notched supports 59 and 60 secured to the top 17 of the casing. A hinged door 61 closes a service opening 62 in the front wall 13 of the casing to gain access to the secondary bag filters for replacement, or the like.

OPERATION

In operation of the apparatus the exhaust fan 36 creates a relatively high current velocity of oil mist ladened air through the apparatus, said current of air being introduced horizontally into the centrifuge chamber through the opening 31 in the casing, the centrifuge diverting the air into a downward path and throwing the larger oil mist particles against the circular baffle 32, the rear wall 14 and downwardly into the pan 18, oil droplets forming on the said walls draining downwardly on the interior of said walls and the pan and finding their way into the drain 20. At the bottom of the centrifuge the current of air takes a sudden and right angled direction across the passageway 47 above the pan, this action of the air and its impingement on the interior surfaces of the pan enabling heavy particles of oil entrained in the air stream to be deposited on the walls of said pan along their longitudinal extents. The air stream then is quite suddenly diverted vertically upwardly into and through the primary oil filter 38 where a considerable amount of the oil mist is entrained in the filtering material to unite as oil drops which fall into the oil pan. The air then continues upwardly through the holes 50 in the secondary filter bags 56, the air passing angularly through the interstices of the bags 56 to entrain the remainder of the oil mist and thence through the discharge pipe 30 to the exhaust fan 33; oil-free air being discharged from the fan through the opening 36.

While apparatus of this invention and its operation have been described for use in the reclamation of cutting oil mist from a carrier air stream it is to be understood that the apparatus may be put to other commercial usages by those skilled in the art; such as in the recovery of kerosene or mineral oil mists generated in or near glass factory equipment, without a departure from the invention expressed in the appended claims.

What is claimed is:

1. Apparatus for effecting separation of oil mist from a carrier air stream and reclamation of the separated oil comprising, a substantially rectangular casing, an oil collecting pan constituting the bottom of said casing, an oil drain means for the pan, a vertical partition member dividing the interior, upper part of the casing into a centrifuge chamber having lines of force operable about a horizontal axis and a vertically operable filter chamber, said partition member having a bottom edge terminated above and in vertical spaced relation with the collecting pan, a tangential oil mist ladened air inlet pipe communicating with the upper end portion of the centrifuge chamber, said centrifuge chamber having its lower portion in open communication with the oil pan, a horizontal, primary oil filter positioned across the bottom of the filter chamber on a level with the bottom end of the partition member, a secondary oil filter positioned across the filter chamber above the primary oil filter, an aperature formed through the partition member beside the secondary oil filter, an air exhaust conduit in communication with the filter chamber through said aperature, said conduit extending horizontally through the central part of the centrifuge chamber and projected through and beyond the casing, and air exhaust means connected to said conduit.

2. The apparatus set forth in claim 1 wherein the rectangular casing has front, rear, and opposed end walls and a top wall, and the oil collecting pan is formed by downwardly, converging portions of the casing front and rear walls.

* * * * *